March 25, 1969  A. G. FERRARI  3,435,105
MANUFACTURING A BALLOON-TYPE HELICAL INSULATOR
Filed Oct. 11, 1965  Sheet 1 of 2
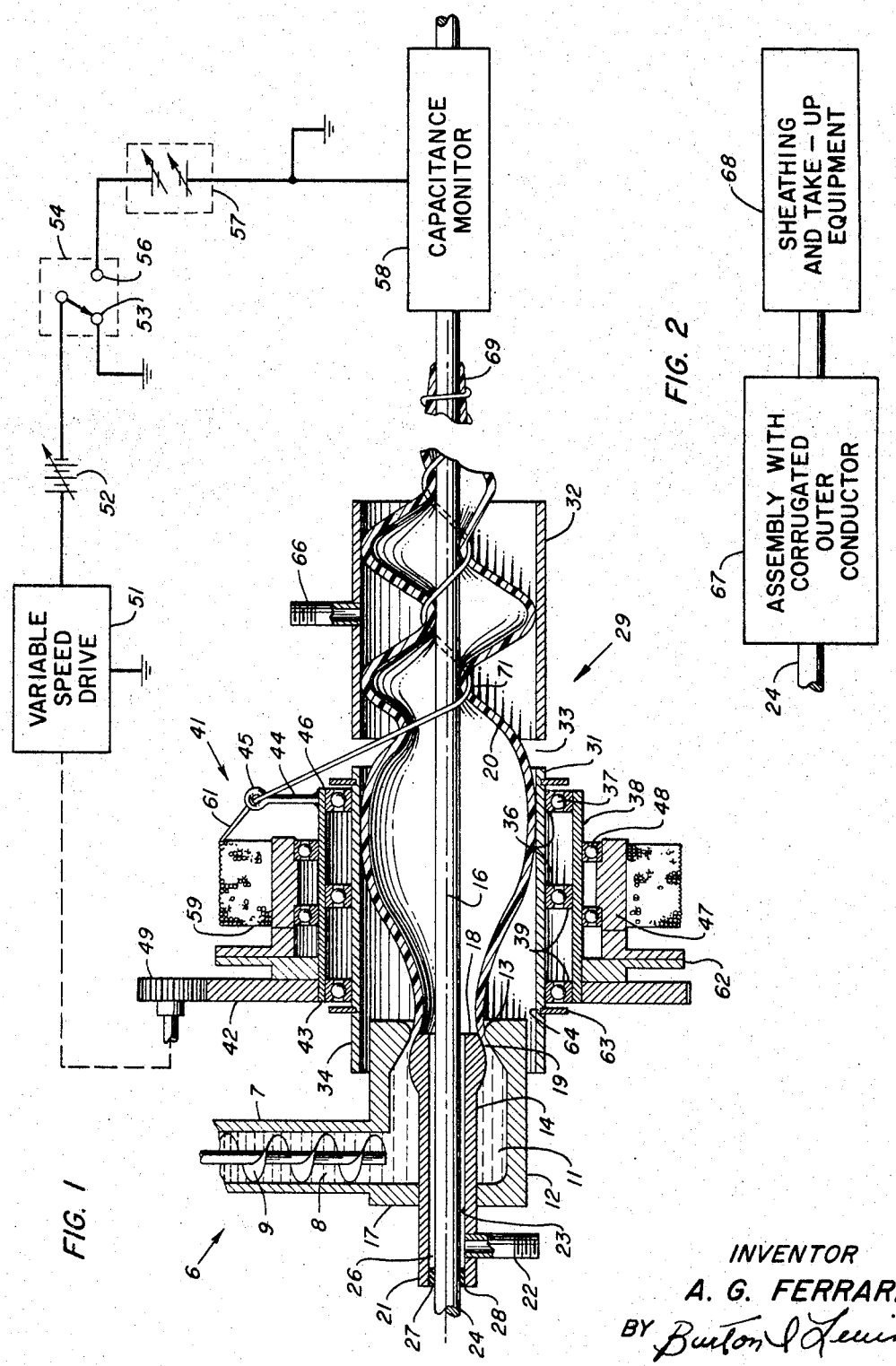
INVENTOR
A. G. FERRARI
BY Burton I Levine
ATTORNEY United States Patent Office 3,435,105
Patented Mar. 25, 1969

3,435,105
MANUFACTURING A BALLOON-TYPE
HELICAL INSULATOR
Armando Gene Ferrari, Trenton, N.J., assignor to Western Electric Company, Incorporated, New York, N.Y., a corporation of New York
Filed Oct. 11, 1965, Ser. No. 494,753
Int. Cl. B29c 17/04
U.S. Cl. 264—95         16 Claims

ABSTRACT OF THE DISCLOSURE

A balloon-type helical insulator of adjustable pitch is formed about an advancing elongated conductor by continuously extruding a tube of moldable plastic around the conductor and inflating the tube to a predetermined diameter. A filament is helically wound at a selectable speed about the advancing inflated tube under sufficient tension to constrict the underlying portions of the tube against the outer surface of the conductor.

Figure 3:
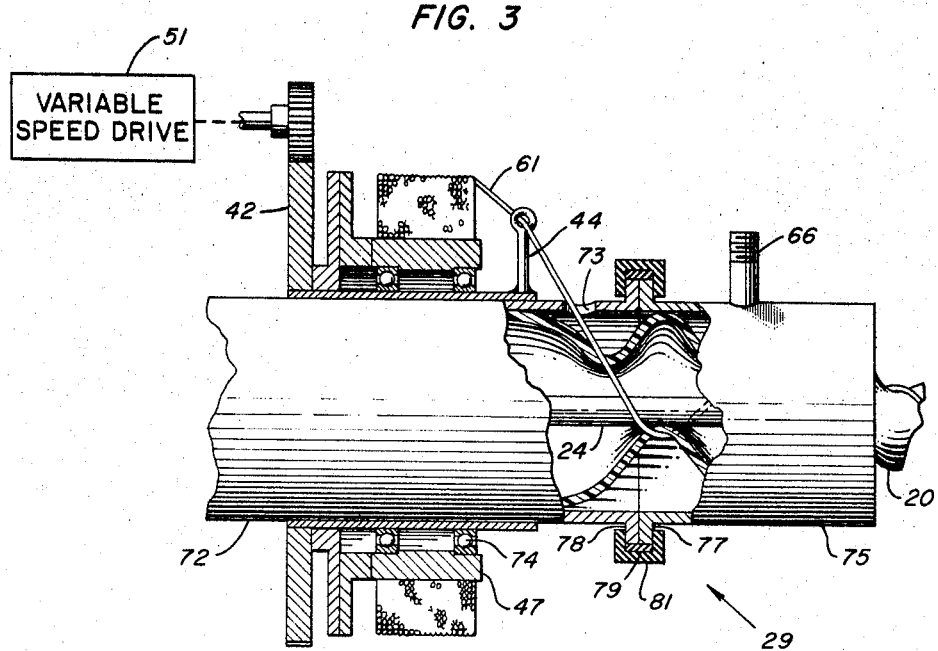

This invention relates to methods of and apparatus for the manufacture of helical articles and, more particularly, to methods of and apparatus for forming a balloon-type helical insulator.

The use of a continuous helical jacket to insulate an electric conductor, and particularly to space the inner and outer conductors of a coaxial line, is well known. This type of insulation, which typically is made of polystyrene or polyethylene, insures both flexibility and adequate mechanical support of the inner conductor. Moreover, because of the inherently high air to plastic ratio of this configuration, a relatively low effective dielectric constant and loss factor is obtained.

One technique often employed to form such helical jackets is to spirally wind a continuous length of plastic ribbon around an inner conductor so that an outer conductor may be supported on the outer edge of the wound ribbon. Another technique, which affords a more continuous support for the conductors, is to extrude a spacer in the form of a helical web of the type described in U.S. Patents 2,465,482 and 2,580,838, respectively issued to T. J. Rhodes on Mar. 29, 1949 and Jan. 1, 1952.

In recent years the demand for cables that exhibit an extremely low dielectric constant and loss factor while maintaining high dielectric strength and good mechanical properties has spurred the development of so-called balloon-type helical insulators. These insulators comprise tubular helical jackets that are formed by appropriately shaping plastic tubes while the tubes are in a plastic state. Typically, an insulator of this type is formed by drawing a plastic tube around the inner conductor of a coaxial line and advancing the resultant assembly through a plurality of synchronously driven endless belts having non-conducting molded bosses thereon. The molded bosses of each belt define a plurality of identical and repetitive mold sections aligned end to end in the direction of advance. The mold sections of the several belts cooperate to form a helical mold cavity around the advancing tube. The tube is typically cooled and solidified within the mold sections of the belts by means of a liquid spray to complete the formation of a ballooned helical insulator.

Unfortunately, the accurate manufacture of tubular helical insulators by this method has proven to be difficult and expensive. Aside from the large initial cost of providing accurately molded belts and associated synchronized drives, the mold sections of the belts tend to wear out quickly and thus require frequent and costly replacement. This occurs because the use of poor heat conductors such as rubber or plastic to form the mold surfaces of the belts leads to non-uniform cooling and consequent distortion of the belts. Moreover, non-uniformity among the mold sections and the relative eccentricity inherent in the synchronized driving wheels introduce an undesirable, periodically recurring irregularity into the finished helical jacket. This periodicity has been found to yield undesirable reflections in coaxial lines embodying this type of insulation at certain critical frequencies of operation that bear a fixed relationship to the repetitive length of the mold sections and the number of sections in engagement with the advancing tube. Finally, the pitch of the resulting helical jacket, which in part determines the effective dielectric constant and characteristic impedance of the cable being formed, is fixed by the spacing of the helical convolutions in the mold sections. Therefore, the possibility of using the same belts for differently pitched runs of insulation is effectively precluded.

One object of the invention, therefore, is to provide new and improved methods of and apparatus for the manufacture of helical articles such as balloon-type helical insulators.

Another object is to provide a method of and apparatus for reducing periodically occurring irregularities formed in tubular helical insulators during the manufacture thereof.

A further object is to provide a method of and apparatus for manufacturing a balloon-type helical plastic insulator having both a high air-to-plastic ratio and a selectable pitch.

One method that illustrates certain features of the invention may be employed, for example, in the formation of a balloon-type helical insulator about an elongated electrical conductor. This method may include the steps of surrounding the conductor with a moldable tube of insulating material, inflating the tube, and winding a filament around the inflated moldable tube to form an elongated helical chamber of the tube about the conductor.

Illustratively, the helical chamber may be formed by winding the filament around the tube to define a helical path, and applying sufficient axial tension to the wound filament to urge a portion of the tube into contact with the outer surface of the conductor along a path substantially parallel to the helical path. Preferably, the resulting helical insulated conductor is then uniformly solidified to retain its helical configuration. The helical path may advantageously be generated by winding the filament at a selectable speed about a conductor that is longitudinally advancing, the pitch of the helix being determined by the winding speed.

Apparatus that illustrates certain features of the invention may be employed, for example, for forming a moldable tube of insulating material into a balloon-type insulator surrounding an elongated conductor. The apparatus may include means for longitudinally advancing the conductor and the surrounding tube, means for inflating the tube, and means for winding a filament about the tube to form an elongated helical chamber of the tube about the conductor.

In a particular embodiment of such apparatus, means are provided for inflating the moldable tube until its outer diameter is constrained by the inner wall of an elongated hollow cylinder in a sizing assembly as the tube is advanced therethrough. Provision is made for helically winding a nonconducting filament under tension around an axial portion of the advancing inflated tube through an aperture in the sizing assembly. The apparatus may further include means for uniformly solidifying the resulting helical jacket as it advances through the sizing cylinder, and means for varying the winding speed to maintain a desired capacitance of the jacketed conductor.

The nature of the present invention, the manner in which it accomplishes the above and related objects, and its various advantages and features are more fully set forth in the following detailed description taken in connection with the appended drawing, in which:

FIGS. 1 and 2 illustrate, partly in schematic and block diagram form, apparatus for practicing the present invention to form a balloon-type helical insulating spacer for a coaxial line; and FIG. 3 is an enlarged view of an alternative embodiment of a portion of the apparatus illustrated in FIGS. 1 and 2.

Referring to the drawing, FIGS. 1 and 2 depict apparatus for forming a tubular helical polyethylene jacket around an elongated conductor in a continuous production line for forming a coaxial cable. The production line includes a cross-head extruder 6 of a type well known in the art. The extruder 6 comprises a cylinder block 7 including an elongated central bore 8. The bore 8 is adapted to receive a feed screw 9 that is rotated by means of a suitable motor (not shown). The feed screw 9 is adapted to knead polyethylene material introduced into the cylinder block 7 into a homogenized mass and to force the resulting mass into a cavity 11 of a cross-head 12 that terminates the bore 8 at right angles thereto. The cylinder block 7 is provided with electric heating coils (not shown) to plasticize polyethylene material introduced into the cylinder block 7.

The cavity 11 is open at one end 13. A core tube 14 is disposed along an axis 16 of the cross-head 12 and is received within a closed end 17 of the cavity 11. A front portion 18 of the core tube 14 cooperates with the open end 13 of the cavity 11 to form an annular orifice 19 through which the polyethylene mass is extruded in the form of an insulating tube 20.

A rear portion 21 of core tube 14 is provided with a first inlet 22 that communicates at one end with an axial bore 23 within the core tube and at the other end with a supply of pressurized gas (not shown). The bore 23 extends through the core tube 14 and is made large enough so that an inner conductor 24 may be axially advanced therethrough with such clearance that a cylindrical passage 26 is formed between the outer surface of the inner conductor 24 and the wall of the bore 23. The cylindrical passage 26 opens into the interior of the insulating tube 20. The rear portion 21 of the core tube 14 is terminated in a gas-impervious packing 27 that surrounds the inner conductor 24 in order to prevent the escape of pressurized gas through one end 28 of the bore 23.

Disposed coaxially about annular orifice 19 is an elongated cylindrical sizing assembly 29 though which the inner conductor 24 and the insulating tube 20 may be advanced while the tube 20 is still in a plastic state. Sizing assembly 29 comprises a pair of aligned cylinders 31, 32 separated by a gap 33. Advantageously, the inner diameter of the cylinders 31, 32 may be larger than the diameter of the insulating tube 20 as the tube emerges from the annular orifice 19. An input portion 34 of the cylinder 31 extends over the portion of the cross-head 12 that overlies the annular orifice 19 to prevent premature heat loss from the moldable insulating tube 20. The walls of the cylinders 31, 32 are made from a good heat conducting material such as copper.

Cylinder 31 is rigidly mounted within the inner races 36 of a plurality of ball bearings 37. A rotatable support 38 is affixed to the outer races 39 of the ball bearings 37, and a winding assembly 41 is rigidly mounted on the support 38.

Winding assembly 41 comprises a winding gear 42 that is fixedly mounted to one end 43 of the rotatable support 38. A radially extending guide rod 44 carrying an eyelet 45 is fixedly mounted to the opposite end 46 of the rotatable support 38. A cop arbor 47 is mounted for rotation, by means of a plurality of bearings 48, about the rotatable support 38 intermediate the winding gear 42 and the radial guide rod 44. The winding gear 42 is driven through a drive gear 49, which is coupled to a DC voltage-controlled variable speed drive 51. The drive 51, in turn, is normally actuated by a DC voltage source 52 through a first contact 53 (designated LOCAL) of a two-position switch 54. However, the drive 51 may also be selectively actuated through a second contact 56 (designated AUTO) of the switch 54, which places an additional variable DC voltage into the control circuit for the drive 51. As explained below, this additional DC voltage is obtained from an output transducer 57 associated with a capacitance monitoring device 58 of a type well known in the art.

A cop 59 upon which a length of filament or strand 61 is wound is fixedly mounted around the arbor 47. The free end of the filament 61 is passed through the eyelet 45 of the guide rod 44 and is then routed through gap 33 to be wound about the insulating tube 20 as described below. The filament 61 advantageously has a high tensile strength and a melting point higher than that of the polyethylene or other material forming the tube 20. The filament 61 may be formed from an electrically non-conducting material, such as nylon; however, if the filament 61 is to be removed from the tube 20 after the latter is hardened, as described below, it may be formed from conductive material such as copper.

An adjustable brake 62 is coupled between the winding gear 42 and the arbor 47. The brake 62 causes adjustable frictional engagement between the winding gear 42 and the arbor 47 so that rotation of the winding assembly 41 about the cylinder 31 causes the filament 61 to be withdrawn from the cop 59 under a degree of tension that depends upon the degree of frictional engagement. The brake 62 is preferably of a type in which the degree of frictional engagement is automatically varied to maintain the filament tension constant despite the decreasing effective radius of the cop 59 as the filament 61 is continually withdrawn therefrom. Such a brake may be similar to that described, e.g., in U.S. Patent 2,666,289 issued to T. T. Bunch on Jan. 19, 1954. Axial movement of the rotatable support 38 is prevented by a pair of split thrust bearing rings 63 mounted upon reduced sections 64 in the wall of cylinder 31

A second inlet 66 is disposed through a portion of the wall of cylinder 32. The inlet 66 communicates at one end with the interior of cylinder 32 and at the other end with a supply of refrigerated inert gas (not shown). Cylinder 32 is made sufficiently long that the insulating tube 20, which enters cylinder 32 in a moldable plastic state, will be fully cooled and solidified by the refrigerated gas when the tube emerges from the cylinder 32.

The capacitance monitoring device 58, which may be of the form described in U.S. Patent 2,804,592, issued to M. C. Biskeborn on Aug. 27, 1957, is disposed in the portion of the production line beyond the output end of cylinder 32 to measure the capacitance between the insulated inner conductor 24 and a reference electrode (not shown) associated with the device 58. The output transducer 57 associated with the monitoring device 58 is a conventional analog control device that produces a variable D.C. voltage whose magnitude is proportional to the difference between the capacitance of the insulated inner conductor 24 and a predetermined capacitance and whose polarity is determined by the sense of the difference.

The measured insulated conductor 24 is routed to an apparatus 67 (FIG. 2) of any suitable type known in the art, for forming an outer conductor (not shown) over the insulated inner conductor 24 to electrically complete the coaxial cable The outer conductor is preferably corrugated or embossed in the manner described, e.g., in copending application Ser. No. 436,597 (D. G. Stetka, inventor) filed Mar. 2, 1965, and assigned to the assignee of the present application. After the outer conductor is in place, the cable is advanced to sheathing and take-up equipment 68. At this time, successive layers of rubber and aluminum are typically formed over the outer conductor, a polyethylene jacket is extruded over the resulting assembly, and the finished cable is wound on take-up rolls to complete the process.

In operation, the uninsulated inner conductor 24 (FIG. 1) of the coaxial cable to be manufactured is advanced axially at constant speed through the bore 23 of the core tube 14 by means of a capstan or a pair of rollers (not shown) associated with the take-up equipment 68 (FIG. 2). As the inner conductor 24 is advanced past the annular orifice 19 (FIG. 1) and into cylinder 31, the insulating tube 20 is continuously extruded around the advancing conductor 24 through the orifice 19. The front end 69 of the tube 20 is permitted to collapse around the conductor 24 to form a gas-tight seal therewith and to cause the tube to be advanced in synchronism with conductor 24. After the gas-tight seal is formed, a stream of pressurized gas is introduced into the bore 23 through the first inlet 22 and is forced along the cylindrical passage 26 of the core tube 14 to be introduced into the interior of the moldable insulating tube 20. The pressure of the gas is adjusted and maintained at a level sufficient to inflate the tube 20 until the outer diameter of the tube is constrained by the inner wall of the cylinder 31. Since the inner diameter of the cylinder 31 is larger than the diameter of the tube 20 as it is extruded through orifice 19, the inflating gas expands the tube 20 and increases its air-to-plastic ratio.

As the inflated tube 20 is advanced through cylinder 31 into the gap 33, the free end of the filament 61 is secured adhesively or by other convenient means to the outside of tube 20 through the gap 33. After the filament 61 is thus secured to the tube 20, the variable speed drive 51 is actuated by voltage source 52 through the local contact 53 of the switch 54. Drive gear 49 thereupon rotates winding gear 42 to withdraw the filament 61 from the cop 59 and thereby to wind the filament 61 around the tube 20 through the gap 33. Since the tube 20 is advanced while the winding gear 42 is rotated, the wound filament 61 forms in the tube 20 an elongated helical chamber defined by a longitudinally disposed helical path 71 whose pitch is determined by the speed of advance of the tube and by the speed of rotation of the winding gear 42. The brake 62 is adjusted so that the tension of the wound filament 61 is sufficient to constrict the portion of the moldable tube 20 adjacent the helical path 71 against the outer surface of the inner conductor 24 along a helical path parallel to the path 71. As indicated above, the tube 20 is maintained in contact with the inner wall of the cylinder 31 by the pressure of the gas applied through the first inlet 22.

As the helically constricted tube 20 is advanced past the gap 33 and into cylinder 32, a refrigerated gas is introduced into cylinder 32 through the second inlet 66. The refrigerated gas cools and solidifies the constricted tube 20 into a permanent helical insulating jacket around the inner conductor 24. Since the material forming the cylinders 31, 32 is a good conductor of heat, the refrigerated gas introduced into the second inlet 66 tends to uniformly cool the portion of tube 20 then advancing through cylinder 32. Once the constricted tube 20 is solidified, the wound filament 61 may be retained in place around the tube 20 or may be removed therefrom, as desired.

The insulated inner conductor 24 is then advanced from the output end of cylinder 32 to the capacitance measuring device 58. Since the pitch of the insulating jacket partially determines the capacitance of the insulated conductor 24, variable speed drive 51 may at this stage be advantageously placed under control of the output transducer 57 through the automatic contact 56 of the switch 54 to modify the winding speed and thus the pitch of the helical path 71. As indicated before, the winding speed and direction are adjusted to maintain the capacitance at a desired level. After the capacitance measurement is completed, the outer conductor is formed over the insulated inner conductor. The resulting assembly is then sheathed and taken up to complete the manufacturing process.

While the invention has been described with reference to sizing cylinders having an inner diameter greater than the outer diameter of the extruding orifice, entirely satisfactory results may be obtained if the inner diameter of the sizing cylinders is made substantially equal to the outer diameter of the orifice. In this latter case, the inflating gas causes the tube 20 to assume its natural extruded diameter.

It will be further noted that, for any desired pitch of the helical path, the utilization of a single constant-speed rotating member to form the path permits each portion of the resulting helical jacket to be substantially identical to every other corresponding portion and not only to those portions spaced therefrom by regularly recurring distances. Hence, the presence of periodically occurring irregularities is greatly minimized.

A modification of the arrangement of FIGS. 1 and 2 is shown in FIG. 3. The sizing assembly 29 comprises a rotatable cylinder 72 having an aperture 73 in the wall thereof for passing the filament 61 therethrough. The cylinder 72 is mounted for rotation within ball bearings (not shown). The winding gear 42 and guide rod 44 are fixedly mounted to cylinder 72, and the brake-coupled arbor 47 is mounted, by means of a plurality of bearings 74, for rotation with respect to the cylinder 72. The second inlet 66 is disposed in a stationary cylinder 75 that forms part of the sizing assembly 29. Cylinder 75 has flanged input end 77 aligned with and abutting a flanged output end 78 of cylinder 72. A gas-impervious packing 79 surrounds the flanged ends 77, 78 and is held in position by a collar 81, which permits rotation of the cylinder 72 with respect to the stationary second inlet 66.

In the operation of the modified arrangement of FIG. 3, the tube 20 is extruded around the inner conductor 24 and inflated, as described above. As the inflated tube 20 is advanced through the rotatable sizing cylinder 72, the nylon filament 61 is secured to the outside of tube 20. The variable speed drive 51 is then actuated, whereupon the cylinder 72 and the aperture 73 are rotated around the advancing tube 20 to wind the filament 61 around the tube and to thus form the helical path 71. As the helically constricted tube 20 is advanced past the rotating aperture 73 into stationary cylinder 75, the refrigerated gas is introduced through the inlet 66 to solidify the tube. The remainder of the manufacturing process is identical to that described in connection with FIGS. 1 and 2.

It is to be understood that the above-described embodiments of the invention are merely illustrative and that many modifications may be made within the scope and spirit of the invention. For example, it will be noted that a tubular helical jacket may be continuously formed over any type of elongated element by the methods described therein. Moreover, although the invention has been described with respect to a particular thermoplastic material (i.e., polyethylene), any other type of suitable thermoplastic material may be employed in connection with the process. Also, by replacing the source of refrigerated inert gas with a source of heat, any suitable thermosetting material may be employed in place of a thermoplastic material.

What is claimed is:

1. In a method of forming a balloon-type helical jacket around an elongated conductor of circular cross section, the successive steps of:
   surrounding the conductor with a moldable and inflatable tube of insulating material whose diameter when inflated is insignificantly greater than the outer diameter of the conductor;
   inflating the tube to bias substantially the entire tube wall outwardly into spaced relation with the surrounded conductor; and
   winding a filament around the inflated tube under tension to urge only a portion of the inflated tube radially inward into engagement with the outer surface of the conductor along a helical path to form an elongated helical chamber of the tube about the conductor.

2. A method as defined in claim 1, wherein the winding step is accomplished with a filament that is formed from electrically nonconductive material.

3. A method as defined in claim 1, wherein the winding step is accomplished with a filament that has a melting temperature higher than that of the tube.

4. In a method of forming a continuous tubular helical jacket around an elongated electrical conductor, the steps of extruding a moldable tube of insulating material about the conductor, expanding the tube to an outer diameter larger than the diameter of the tube as extruded, and winding a filament around the expanded tube under tension to constrict the portion of the tube adjacent the wound filament against the outer surface of the conductor along a substantially helical path.

5. In a method of forming a continuous tubular helical jacket around an elongated conductor, the steps of extruding a moldable insulating tube around the conductor, inflating the tube, winding a filament helically around the inflated tube to define a helical path, and applying sufficient axial tension to the wound filament to constrict the tube against the outer surface of the conductor along a path substantially parallel to the helical path.

6. A method according to claim 5, comprising the further step of uniformly soldifying the constricted tube into a shape-retaining jacket.

7. A method of forming a continuous tubular helical jacket of desired pitch from a moldable plastic tube that surrounds an elongated conductor, comprising the steps of longitudinally advancing the tube and the conductor, inflating the tube, winding a filament around the advancing tube at a speed selected to produce a helical path of the desired pitch, and applying sufficient axial tension to the wound filament to constrict the portion of the advancing tube adjacent the wound filament against the outer surface of the conductor along a path substantially parallel to the helical path.

8. A method of forming a helical jacket from a moldable insulating tube that surrounds an elongated conductor, comprising the steps of longitudinally advancing the tube and the conductor, inflating the tube, winding a filament around the advancing tube to define a helical insulating chamber about the conductor, measuring the capacitance of the insulated conductor with respect to a predetermined electrode, and adjusting the winding speed to maintain the capacitance of the insulated conductor at a predetermined value.

9. Apparatus for constricting a moldable insulating tube into a balloon-type helical jacket surrounding an elongated conductor, comprising an elongated hollow sizing cylinder, means for longitudinally advancing the tube and conductor through the sizing cylinder, means for inflating the tube into contact with the wall of the sizing cylinder, and means for helically winding a filament under tension about the inflated tube.

10. Apparatus according to claim 9, further including means for solidifying the constricted tube into a shape-retaining insulating jacket around the elongated conductor.

11. Apparatus according to claim 9, in which the sizing cylinder includes first and second longitudinally aligned portions separated by an annular gap, and the winding means are mounted for rotation around the first portion.

12. Apparatus according to claim 9, in which the sizing cylinder includes an apertured wall portion, the sizing cylinder is mounted for rotation about the advancing conductor, and the winding means are fixedly mounted to the sizing cylinder.

13. Apparatus according to claim 9, further comprising means for driving the winding means at a selectable speed, and means for adjusting the speed of the driving means to maintain a predetermined capacitance of the helically jacketed conductor.

14. Apparatus according to claim 9, in which the winding means comprises a winding gear mounted coaxially about the sizing cylinder, filament-receiving means rotatable with respect to the winding gear, and means for providing frictional engagement between the winding gear and the filament-receiving means.

15. Apparatus according to claim 14, comprising additional means for driving the winding gear at a selectable speed.

16. Apparatus according to claim 15, comprising additional means for adjusting the speed of the driving means to maintain a predetermined capacitance of the helically jacketed conductor.

References Cited

UNITED STATES PATENTS

| | | | |
|---|---|---|---|
| 2,465,482 | 3/1949 | Rhodes | 18—13 |
| 2,513,106 | 6/1950 | Prendergast | 18—14 |
| 2,708,176 | 5/1955 | Rhodes | 264—209 X |
| 2,743,759 | 5/1956 | Snow et al. | 156—172 X |
| 2,760,228 | 8/1956 | Verges | 264—209 X |
| 2,805,180 | 9/1957 | Burr. | |
| 3,288,895 | 11/1966 | Windeler | 264—174 X |
| 3,223,760 | 12/1965 | Roberts et al. | 264—94 |
| 3,327,039 | 6/1967 | Rückert et al. | |

ROBERT F. WHITE, *Primary Examiner.*

A. R. NOE, *Assistant Examiner.*

U.S. Cl. X.R.

18—13, 14; 29—202.5, 452; 156—172, 425; 264—173, 272

U.S. DEPARTMENT OF COMMERCE

PATENT OFFICE

Washington, D.C. 20231

UNITED STATES PATENT OFFICE
CERTIFICATE OF CORRECTION

Patent No. 3,435,105                                                         March 25, 1969

Armando Gene Ferrari

It is certified that error appears in the above identified patent and that said Letters Patent are hereby corrected as shown below:

Column 3, line 66, "a ffixed" should read -- affixed --. Column 4, line 69, "cable" should read -- cable. --. Column 6, line 69, "insignificantly" should read -- significantly --.

Signed and sealed this 7th day of April 1970.

(SEAL)
Attest:

Edward M. Fletcher, Jr.                                     WILLIAM E. SCHUYLER, JR
Attesting Officer                                                   Commissioner of Patents